Inventors
Ivan Witalis Grundin
Harry Freese

Attorneys

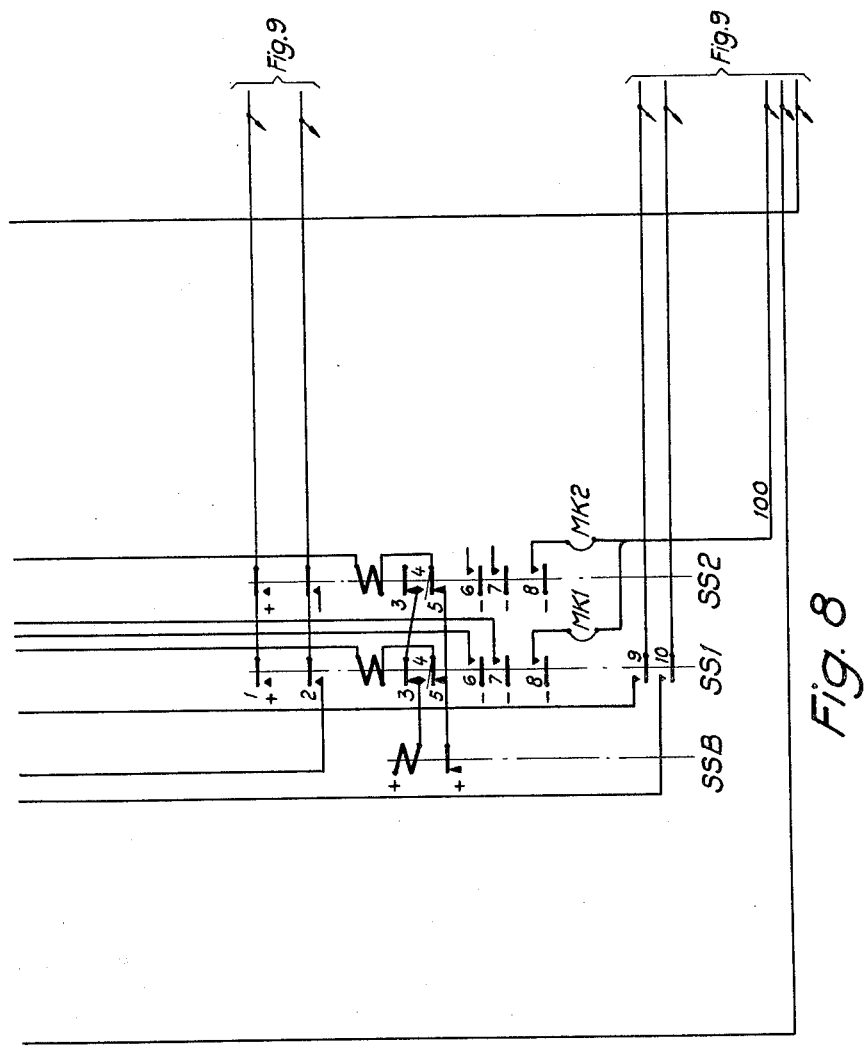

Oct. 12, 1965    I. W. GRUNDIN ETAL    3,211,835
AUTOMATIC TELECOMMUNICATION SYSTEM
Filed April 27, 1961    11 Sheets-Sheet 9
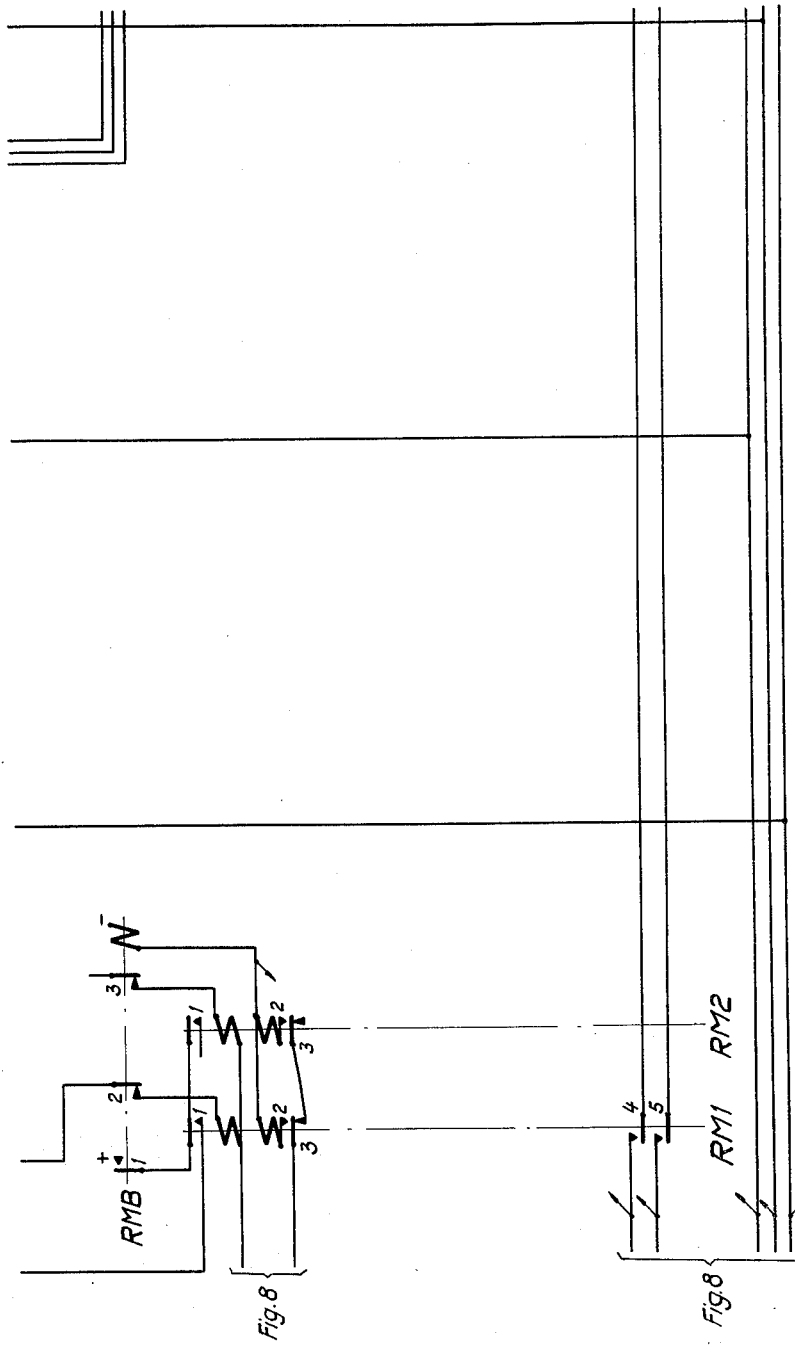
Inventors
Ivan Witalis Grundin
Harry Freese
Attorneys

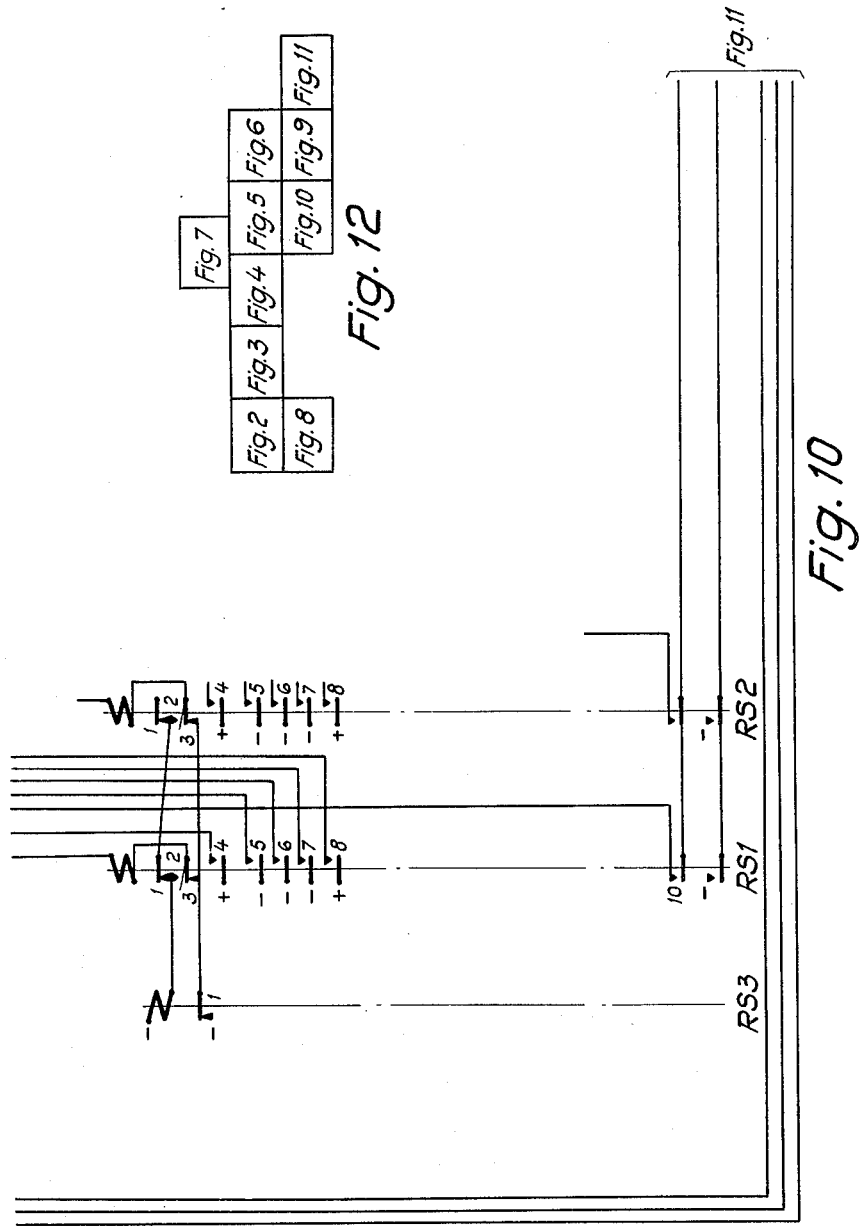

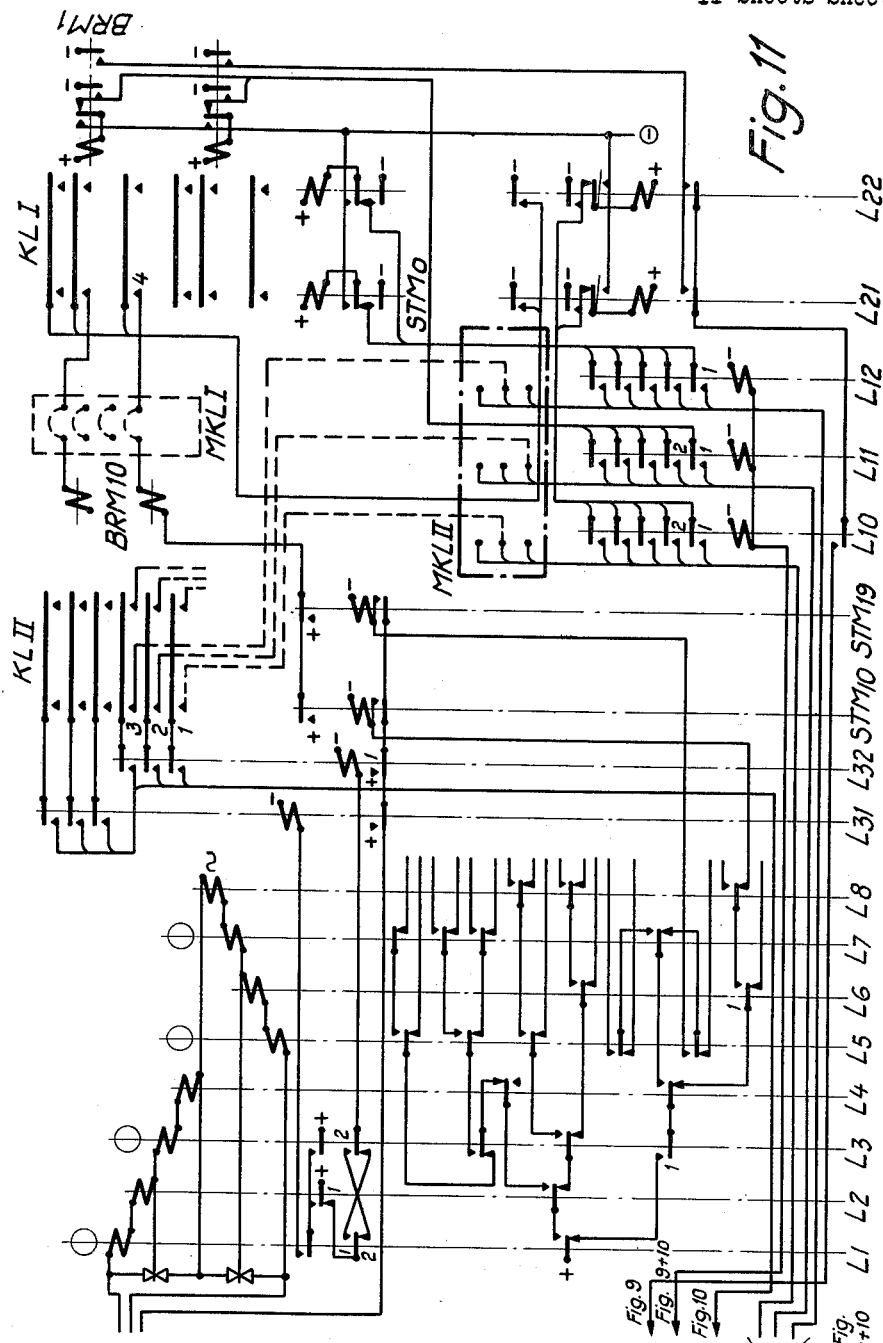

United States Patent Office

3,211,835
Patented Oct. 12, 1965

3,211,835
AUTOMATIC TELECOMMUNICATION SYSTEM
Ivan Witalis Grundin, Stockholm, and Harry Freese, Bromma, Sweden, assignors to Svenska Relafabriken ABN AB, Tyreso, Sweden, a joint-stock company of Sweden
Filed Apr. 27, 1961, Ser. No. 106,000
3 Claims. (Cl. 179—18)

In automatic telecommunication systems and particularly in private automatic branch exchange systems certain subscribers have a need of high speed communication, i.e., facilities of establishing connections with certain other subscribers more easily and expeditiously than is possible by the ordinary dialling or key sending procedure.

To meet this need it has been proposed to provide individual intercommunication systems for each group of such subscribers, said intercommunication systems being separate from the common private branch exchange. However this method of providing high speed communication facilities is very expensive, since the equipment for the high speed traffic is divided into a plurality of small systems each having a small traffic handling capacity.

It has also been proposed to provide the private branch exchange with facilities of high speed communication to a limited number of subscribers. In such systems the high speed establishment of a connection is usually effected by means of so called individual keys, and each subscriber's station that can be called in the high speed communication system is represented by a characteristic signal from the key sets of the stations. Since the number of possible signals in practice is very limited, the total number of subscribers that can be called by means of individual keys becomes small.

The present invention relates to a system for high speed communication in which switching means are used in common for a high speed service and for the normal traffic. According to the invention information on the number or group of the calling station is sent from the line equipment to the controlling equipment, for instance registers or markers, and with the guidance of this information and a given signal from the subscriber's station to the controlling equipment the controlling equipment directs the call to the desired destination. Hereby the signals from the individual keys of each station can be the same as the signals from another station, but although the signals sent from different stations to the registers are identical, the connection can be extended to different destinations according to which station initiated the call.

Therefore the number of subscribers' stations which can be called by means of the high speed communication facilities can be made very large, and theoretically it may comprise all subscribers' stations connected to the private branch exchange. However, the maximum number of high speed connection possibilities for a certain subscriber's station is limited to the number of possible control signals (individual keys). This is however no disadvantage, since for each subscriber the number of stations to which he has a need of high speed connections is limited.

Since the number of signals can be kept low, a considerable technical simplification of the equipment is attained.

The invention will be described more in particular in conjunction with the accompanying drawings.

FIG. 1 shows a plan of a switching chain in for instance an automatic telephone system embodying the invention. The system comprises subscribers' stations A, final selectors LV, group selectors GV, registers REG which are connectable by selectors SV to link circuits SNR which are connected to inlets in the group selector GV. MS and MG designate markers for the selectors LV and GV respectively. L designates an analyzer and decoder for identification of signals from individual keys and for indicating the number of the station called by means of the individual key. S1, S2, M1, M2 and M3 designate means for connecting the markers MS and MG and registers REG to the common transmission circuit.

FIG. 2 shows a simplified diagram of a marker for a final selector LV comprising 100 subscribers having key sets with individual keys which are divided in known manner in groups of ten. A tens relay (T0, T1) has been allotted to each tens group. A units relay (E0, E1) has been allotted to subscribers' stations having the same units digit.

FIG. 3 shows a final selector stage consisting of primary and secondary selectors. The primary selectors, two of which are shown, are designated KV1 and KV2, and the secondary selectors, two of which are shown, are designated KV3 and KV4. The subscribers' lines for subscribers' stations A101 and A110 are indicated in KV1 and KV2. Relay S2 is included in the connecting means designated M3 in FIG. 1 for the control circuit which consists of the three conductors at the bottom of the figure.

FIG. 4 shows a group selector unit consisting of the primary selector KV5, the secondary selector KV6 for speech connections and a selector KV7 for selecting control wires, the selector KV7 being common to a plurality of group selector units. In selector KV6 two outlets to the final selector unit shown in FIG. 3 are indicated, for instance comprising the first hundred number. Each of the holding magnets GB1 and GB2 in KV5 are allotted to an inlet to a connecting link (FIG. 7). Relay G1 is included in the connecting means designated M2 in FIG. 1 for the information circuit which consists of the three conductors at the bottom of the figure.

FIGS. 5 and 6 show parts of a register. The relays R121, R122 and R123 are arranged in a chain for finding a free link circuit. The crossbar switch shown at the top of FIG. 5 connects the control circuit between registers, link circuits and group selectors. Relays R50, R51, R52, and R53 are comprised in a relay chain for the reception of key-set pulses and for storing units digits. Relays R60 and R61 store the hundreds digits 0 and 1, and relays R80 and R81 store the tens digits 0 and 1.

FIG. 7 shows a link circuit. The wires a, b, c and e are included in the speech connection and designate the input side of the link circuit. The wires a2, b2, c2 and e2 designate the corresponding output side.

FIG. 8 shows in detail the connecting means S1 (FIG. 1) which comprises one connecting relay SS1 and SS2 for each final selector LV. Relays SS1 and SS2 are arranged in an interlocking chain so that only one final selector at a time can actuate the transmission circuit IB which consist of the conductors at the bottom of the figure.

FIG. 9 shows in detail the connecting means M1 (FIG. 1) which comprises separate connecting relays RM1 and RM2 for different registers. RM1 and RM2 are arranged in an interlocking chain whereby only one register at a time can actuate the transmission circuits IB.

FIG. 10 shows in detail the connecting means S2 (FIG. 1) which comprises separate connecting relays RS1 and RS2 for different registers. RS1 and RS2 are also arranged in an interlocking chain whereby only one register at a time can actuate the transmission circuits IB2 which consist of the conductors shown at the bottom of the figure.

FIG. 11 shows in detail the analyzer designated L in FIG. 1.

FIG. 12 shows how FIGURES 2 to 11 should be assembled to form a more complete circuit diagram.

Figure 1:
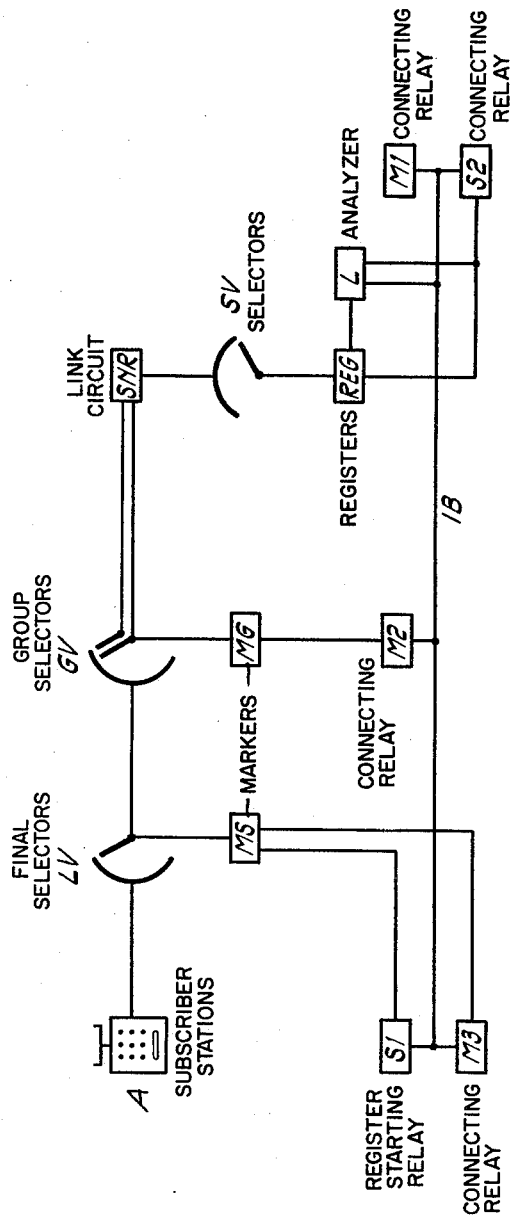

Referring now to FIG. 1 the train of operations for establishing a connection is broadly as follows.

When the subscriber at station A originates a call the marker MS is seized in known manner. The connecting means S1 is operated from the marker. The connecting means S1 applies starting potential through the connecting relays for the registers, and the first idle register REG operates its connecting relay M1, whereafter the analyzer L connects itself to the transmission circuits IB. Information on the number of the calling subscriber is now sent from S1 over these circuits to the analyzer L.

The register REG now hunts by means of selector SV for an idle link circuit SNR and the associated group selector GV. When this has been seized, the connecting relay M2 for the marker MG of the group selector is operated (if IB is idle) whereby the marker is connected to IB.

The analyzer now applies criteria corresponding to the received number to the conductors in IB, and these criteria are received by the marker MG of the group selector GV. At the same time the two last digits of the subscriber number are transferred over the conductors to the final selector LV belonging to the respective hundreds number.

The idle links between LV and GV are now marked and the setting of LV and GV is effected whereafter IB is released.

The subscriber's station is now connected to the register and sends digit information to this in the normal manner over the line branches. If the subscriber has sent digit signals, the register when a sufficient number of information items has been received connects itself to the transmission circuit IB, and the required information is sent over these circuits to GV and LV in the manner described above. If the subscriber has operated an individual key the corresponding signal is transferred to the analyzer L which connects itself to the transmission circuit IB and transmits the required information over this circuit to GV and LV.

Figure 2:
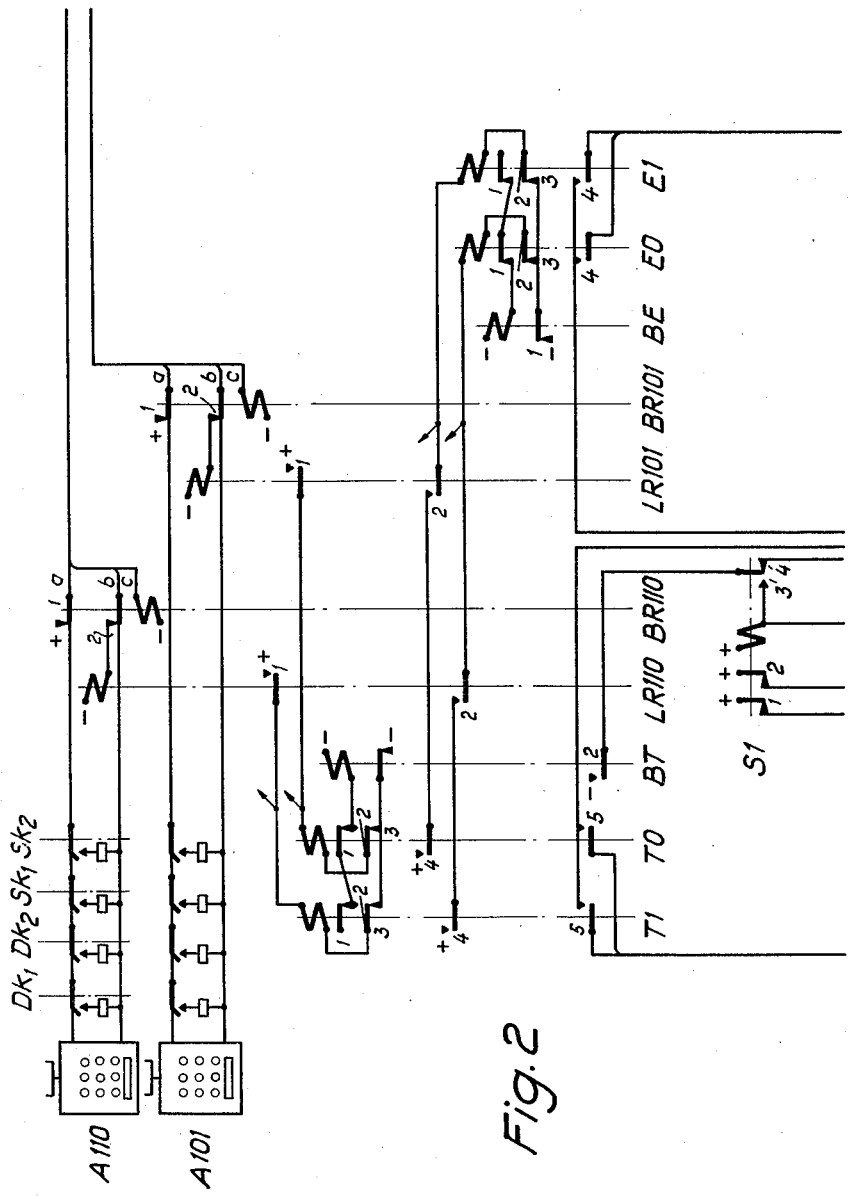

The operation of the system will now be described in detail assuming that a connection is to be established from station A110 to station A101 in FIG. 2. For signalling purposes the telephone instrument is provided with a number of digit keys two of which SK1 and SK2 are shown, and a number of individual keys two of which DK1 and DK2 are shown in FIG. 2.

In the following description some sequences of relay functions are indicated by diagrams in which the relay designations are arranged in the order in which the relays are operated or released. The operation of a relay is indicated by the corresponding relay designation being underlined with a full-drawn line, and the release of a relay is indicated by a relay designation being underlined with a dotted line. When one relay causes the operation or release of several other relays, the designations of the latter relays are arranged in a vertical column after the relay which caused the operation or release.

A key at station A110 is operated and a loop is closed over the a- and b-conductors to relay LR110. The relays are operated as follows:

LR110—T1—BT
 —E0—BE

The tens relay T1 and the units relay E0 are arranged in known manner and indicate the tens digit 1 and the units digit 0.

When relay BT operates a circuit is closed from battery over contact 2 of BT to the winding of relay SS1 in FIG. 8. Relay SS1 operates and causes the operation of the relay SSB. Relay SSB prevents the operation of any other relay in the chain of relays in which the shown relays SS1 and SS2 are included.

Figure 5:
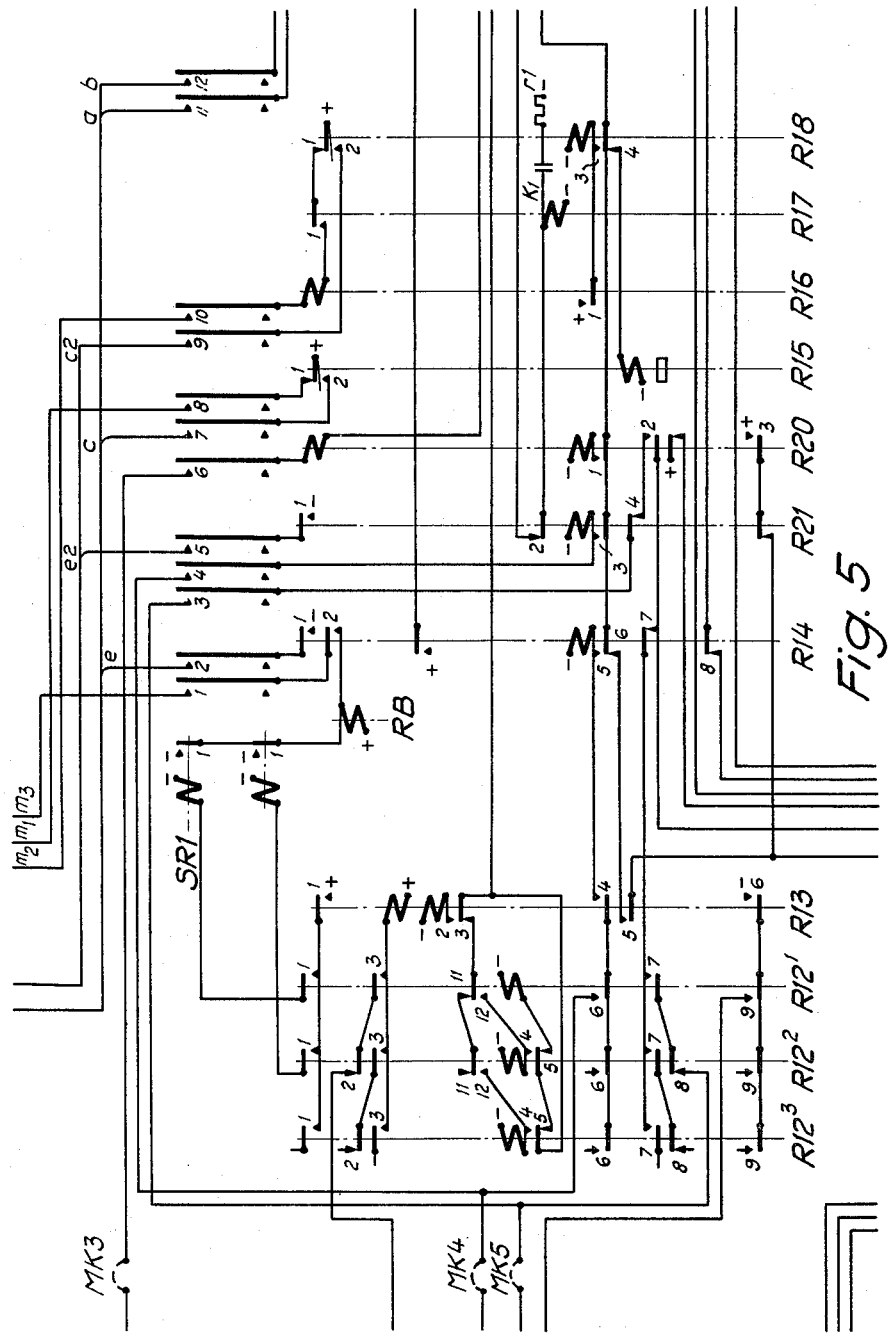
Figure 6:
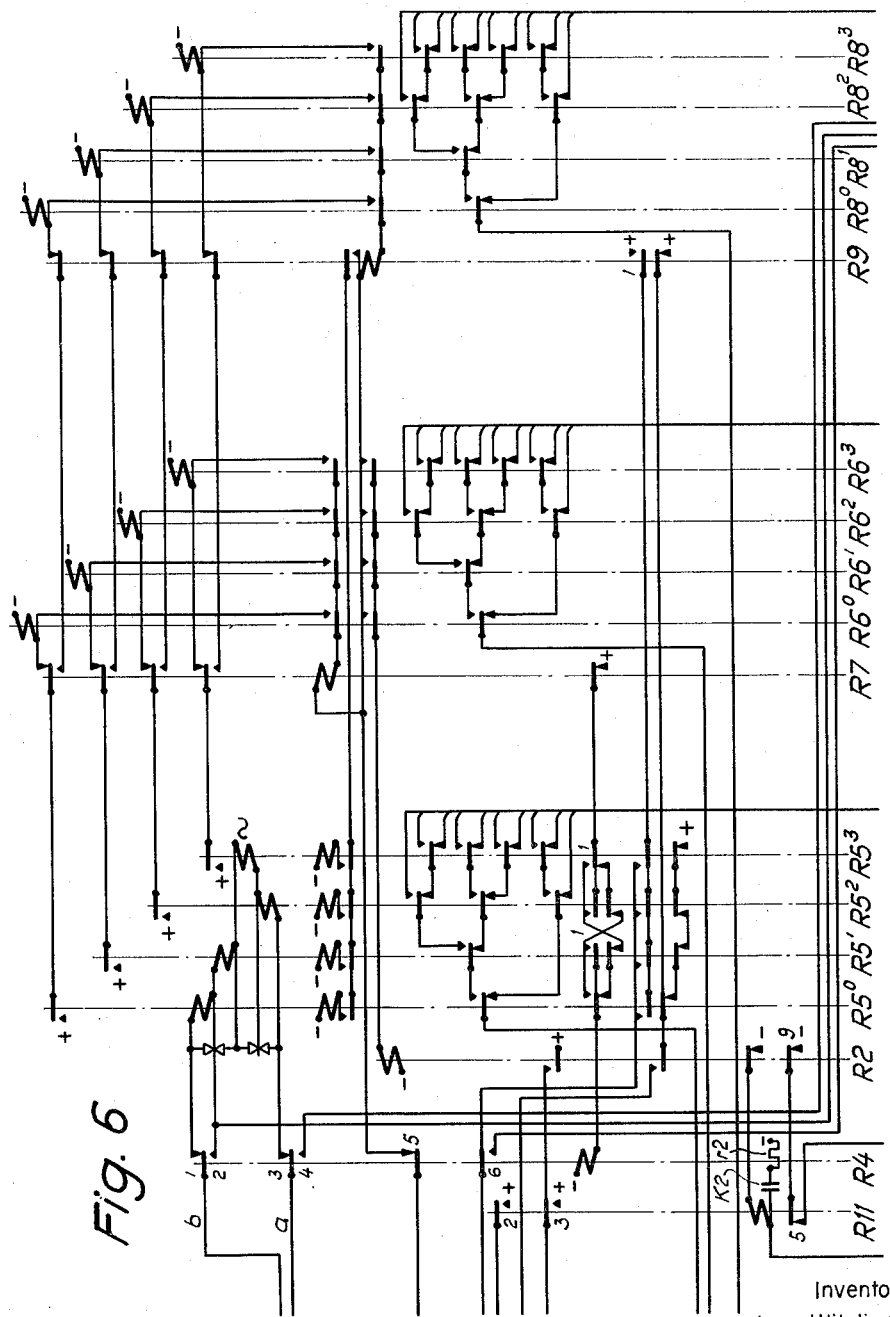

Relay SS1 closes a common starting circuit from positive potential on contact 1 of SS1 to the upper windings of relays RM1 and RM2 (FIG. 9) which belong to separate registers one of which is shown in FIGS. 5 and 6.

Assuming now that the register belonging to relay RM1 is idle, relay RM1 is energized in the said circuit which extends over contact 5 on relay R11 and contact 9 on relay R2 (FIG. 6) to negative potential. The operation of relay RM1 causes the following relay operations:

RM1—RMB—R11
 —L10
 —L11
 —L12

The number of the calling station is now marked over contacts on relays L10, L11 and L12 on selecting magnet STM0, holding magnet BRM1 and relay L21 in the analyzer L, (FIG. 11).

STM0 which corresponds to the units digit 0 is energized under control of contact 7 of relay SS1 (FIG. 8), contact 4 on relay E0 (FIG. 2) and contact 1 of relay L12 (FIG. 11).

BRM1 which corresponds to the tens digit 1 is energized under control of contact 6 of relay SS1, contact 5 of relay T1 and contact 2 of relay L11.

L21 which corresponds to the hundreds digit 1 is energized under the control of contact 8 of relay SS1, the connector MK1 and contact 2 of relay L10.

STM0, BRM1 and L21 when operated close holding circuits for themselves.

The number 110 of the calling station is now stored in the analyzer (FIG. 11) by STM0, BRM1 and L21 being in operated condition.

A receipt signal is now transmitted to S1 (FIG. 2) under the control of BRM1 and L21. Relay S1 is energized, and hereby relays SS1, SSB, RM1 and RMB are released. The information circuit is hereby wholly disconnected from the marker and the register.

In the register relay R11 is maintained in operated condition by means of the delay device consisting of capacitor K2 and resistor r2.

The register is now to be connected to calling the station.

Relay R11 (FIG. 6) starts hunting for an idle link circuit by means of positive potential over contact 2 of R11 and energizes relay R15 (FIG. 5) by means of positive potential over contact 3 of R11. Thus the operation of relay R11 initiates the following relay operations:

R12$^I$—R13—SR1—RB
R15

Figure 4:
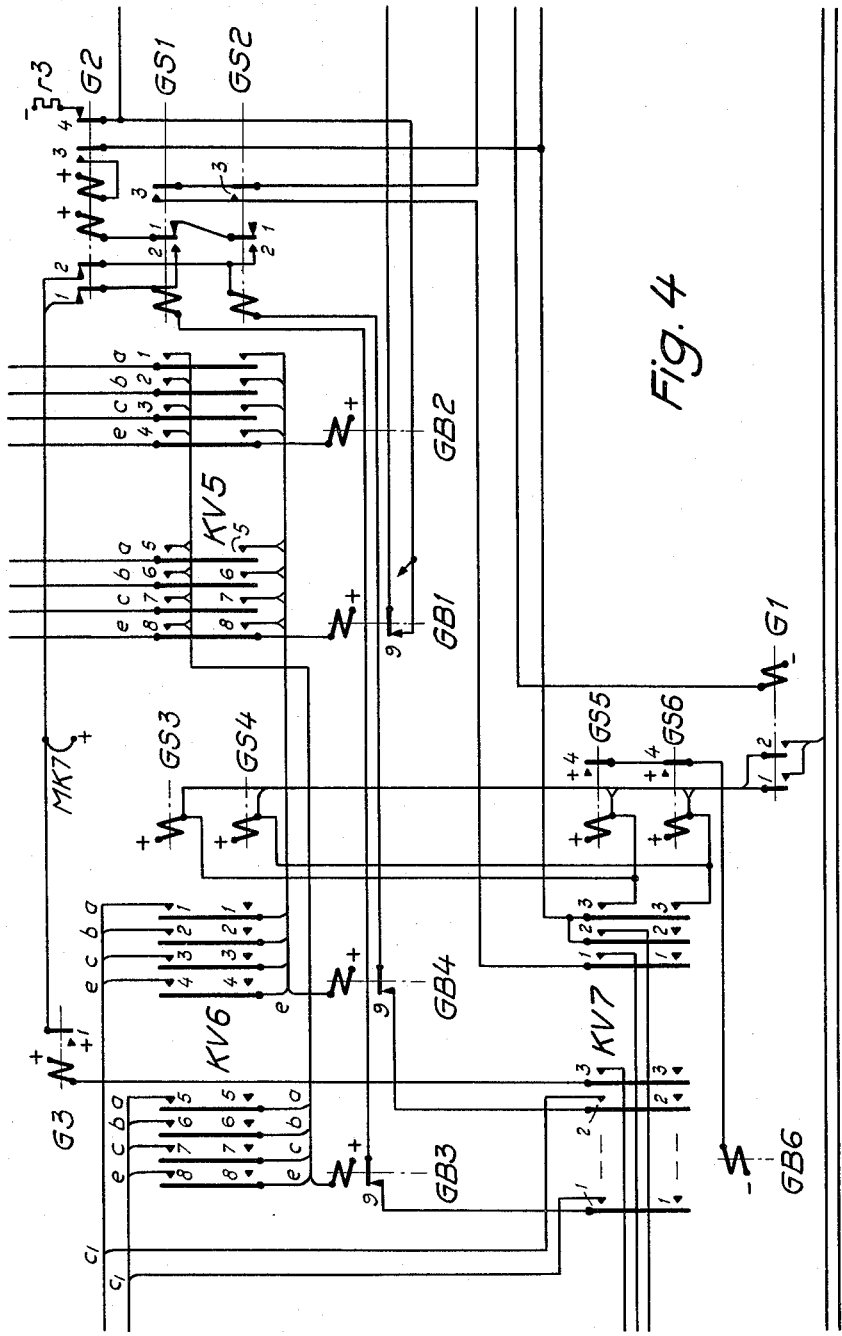

The test relay R13 (FIG. 5) is energized under the control of contact 9 of holding magnet GB1 and contact 4 of relay G2 (FIG. 4). Contact 4 of G2 checks that the group selector to which the incoming side of the link circuit is connected, is idle, and contact 9 of GB1 checks that the link circuit connected to the holding magnet is idle. When an idle link circuit has been found the register is ready to connect the information path for operating the group selector GV and the final selector LV. The closure of contact 5 of relay R13 causes the operation of relay RS1 (FIG. 10), and this causes the operation of relay RS3. Relay RS3 prevents the operation of any other relay in the relay chain in which relays RS1 and RS2 are included. The closure of contact 10 of relay RS1 causes the operation of relays L10, L11 and L12 in the analyzer (FIG. 11).

Relay G1 (FIG. 4) is operated in a circuit extending over contact 4 of relay RS1 (FIG. 10), contact 7 of relay R121 (FIG. 5) and the connector MK5 (FIG. 5) and connects the common information circuits to the group selector over contacts 1 and 2 of G1.

The information circuits receive negative potential over contacts on relays L10, L11 and L12 and contacts on selecting magnet STM0, holding magnet BRM1 and relay L21.

The hundreds digit 1 is marked in the group selector GV by the operation of selecting magnets GS3 and GS5 under the control of contact 1 of G1, contact 1 of L10 and is marked in the final selector LV by the operation of relay S2. The operation of selecting magnet GS5 (FIG. 4) causes the operation of holding magnet GB6.

The tens digit 1 is marked in the final selector LV (FIG. 3) by the operation of selecting magnets S*t*–1 and L*t*–1 under the control of contact 4 of relay S2 and contact 2 of relay L11 (FIG. 11).

The units digit 0 is marked in the final selector (FIG. 3) by the operation of selecting magnets S*e*–0 and L*e*–0 under the control of the contact 1 of relay S2 and relay L12 (FIG. 11).

Provided that one of the shown connecting lines between the final selector and the group selector is free the holding magnet GS1 (FIG. 4) is energized in the following circuit: negative potential, contact 2 of S*t*–1, contact 7 of B*t*–1, contact 9 of B1, wire *c*1, contact 1 of GB6, contact 9 of GB3, winding of GS1, contact 1 of G2, connector MK7, positive potential. The operation of selecting magnet GS1 causes the operation of relay G2.

Figure 3:
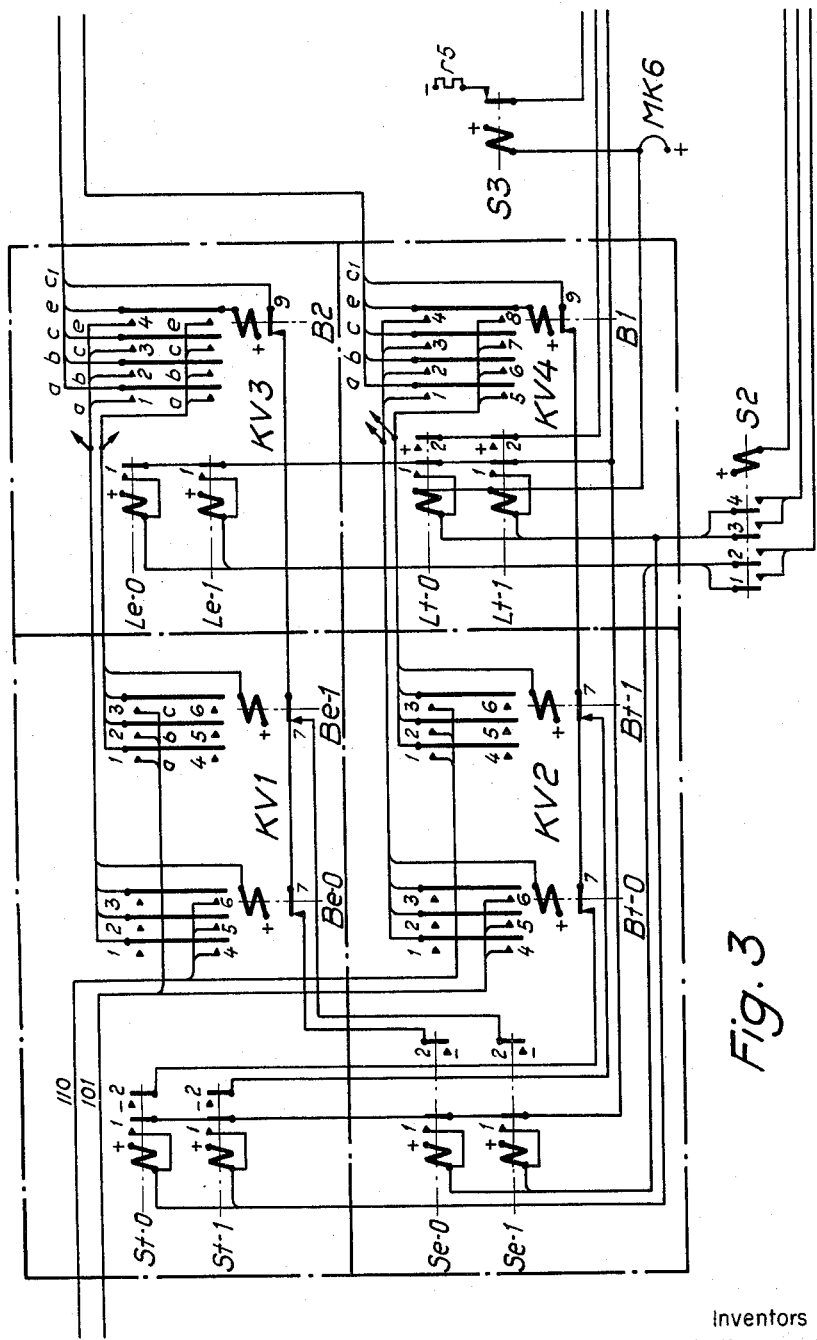

When all selecting magnets in the desired connection are in operating condition, a receipt signal is sent to the register in the form of a positive potential over contact 2 of L*t*–1 (FIG. 3), contact 1 of GS5 (FIG. 4), contact 3 of GS1, connector MK4 (FIG. 5), contact 6 of R121, contact 4 of R13, winding of relay R14. Relay R14 (FIG. 5) operates and thereby causes the release of relays RS1, RS3 (FIG. 10), and G1 (FIG. 4). The release of relay RS1 (FIG. 10) causes the release of relays L10, L11 and L12 (FIG. 11). The release of relay L10 (FIG. 11) causes the release of relay S2 (FIG. 3).

Figure 7:
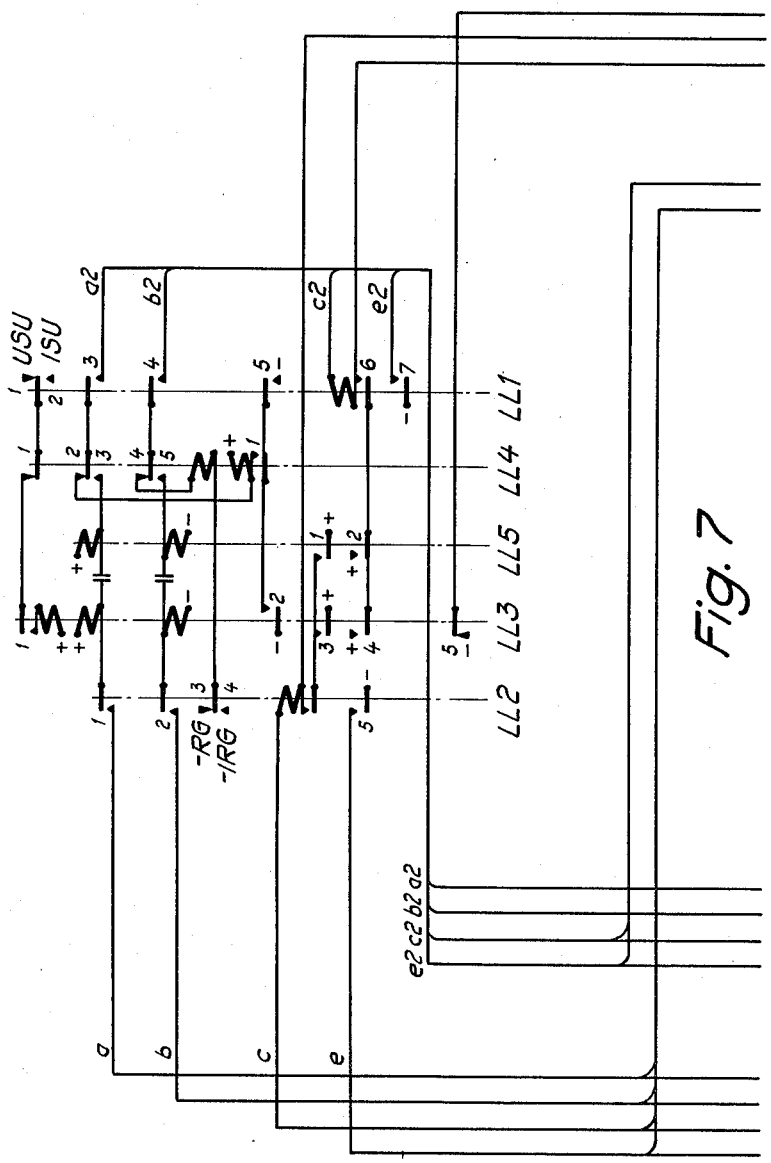

The operation of relay R14 (FIG. 5) also causes the operation of holding magnet GB1 (FIG. 4) belonging to the link circuit (FIG. 7). Holding magnet GB1 is energized in the following circuit: negative potential, contact 1 of R14, contact 2 of RB, wire *e* through the link circuit (FIG. 7), winding of GB1, positive potential. The wire *e* is connected by contact 8 of GB1 to crossbar switch KV6 in which holding magnet GB3 is operated. Contact 8 of GB3 connects the wire *e* to crossbar switch KV4 (FIG. 3) in which holding magnet B1 is operated. Hereby the wire *e* is extended to holding magnet B*t*–1 of crossbar switch KV2. Hereby an energizing circuit for relay BR110 (FIG. 2) is closed over the wire *c* to positive potential on contact 2 of relay R15 (FIG. 5). Relay BR110 operates and hereby relay LR110 is released. The release of relay LR110 causes the release of relays T1, BT, E0 and E1. The subscriber's station A110 has now been connected to relays R50–R53 (FIG. 6) in the register. The following switching members are in operating condition: BR110 (FIG. 2) B*t*–1 B1 (FIG. 3), GB3, GB1 (FIG. 4), RB, R14, R15 (FIG. 5), R11 (FIG. 6), R12, R13 (FIG. 5), S*t*–1 L*t*–1 S*e*–0 L*e*–0 (FIG. 3), GB3, GS5, GB6, G2 (FIG. 4), SR1 (FIG. 5).

The key operated at the calling subscriber's station is now marked on the signal receiving relays R50–R53 in the register (FIG. 6). In the shown embodiment an alternating current which is sent in parallel over both branches of the subscriber's line is used for signalling. According to which key is operated one or both of relays R50–R51 will be operated over branch *a* and one or both of relays R52 and R53 will be operated by current over branch *b*. When normal digit signals are sent, at least one relay in each branch is operated. When an individual key is actuated however relays in the register are operated only in one of the branches. This operation can be effected for instance by means of a registor associated with the actuated key the resistance of which is so large that the relays in one branch do not receive sufficient current to operate.

When ordinary digit signals are sent, the first digit is stored on relays R60–R63, the second digit in relays R80–R83 and the third digit in relays R50–R53. When the first digit has been stored in the register on relays R60–R63, relay R2 is operated. The operation of relay R2 results in the following sequence of relay operations:

R2—R17—R121—S*t*–1
 —R11—R13—L*t*–1
  —S*e*–0
  —L*e*–0
  —GS3
  —GS5—GB6
  —G2
  —SR1

If the calling subscriber actuates digit keys, the sequence of events by which the desired connection is established, is started when the desired number has been stored in the register. This sequence of events is similar to that which takes place when the calling subscriber initiates a call with the difference however that after the register has received the third digit and relay R9 (FIG. 6) has operated, the relays RS1–RS2 (FIG. 10) of the register is operated over contact 3 of relay R20 (FIG. 5) which is operated over contact 1 of relay R9. The RS1 (or RS2) relay seizes the common information path and the required information is transmitted over the pyramid connected contacts of relays R50–R53 and R–60 and R80–R83 (FIG. 6) by the closure of contacts 6, 7 and 8 of relay RS (FIG. 10).

It is now assumed that the subscriber at the calling station actuates an individual key instead of digit keys. In such case a digit receiving relay in the register is operated only in one line branch. Assume for instance that relay R53 which is connected to branch *b*, is operated. Hereby relay R4 in the register (FIG. 6) receives current over contact 1 of R53 and is energized. Relay R4 by its contacts 2 and 4 now connects the line branches to the pulse receiving relays L1 to L8 in the analyzer (FIG. 11).

In the analyzer relays L5 and L6 and L3 will be energized. The relays marked with a ring operate even for weak current.

The selecting magnet STM10 of crossbar switch KLII now receives energizing current over contact 1 of L3 and contact 1 of L6. Relay L32 is energized by current over contact 1 of L2, contact 2 of L1 and contact 2 of L3.

Since contact 4 in the crossbar switch KLI has previously been closed indicating that the call emanates from station A110, the holding magnet BRM10 of crossbar switch KLII is now operated.

The multiple contacts 1, 2 and 3 of crossbar switch KLII are connected over the connector MKLII to conductors in the information circuit representing the (three digit) number of the called station. The intermediate connector MKLII allows the connection of the multiple contacts of crossbar switch KLII to the information circuit in any arbitrary manner, so that a certain signal transmitted by the actuation of an individual key may cause the calling of any desired number. In the given example it is assumed that contact 1 belonging to STM10 is connected to a terminal in MKLII for the transmission hundreds digit 1, and contact 2 is connected for transmission of the tens digit 0, and contact 3 is connected for transmission of the units digit 1. The actuation of another individual key at the same calling station may cause the operation of for instance selecting magnet STM19, and the multiple contacts belonging to this selecting magnet in the crossbar switch KLII are connected to another combination of terminals in connector MKLII, so that in that case a different station would have been called.

When the number of the desired station has been stored in the crossbar switches of analyzer L, the sequence of events is started by which the desired connection is established. The outgoing side of the seized link circuit is now to be connected to station A101.

At first the condition in the group selector is tested. If this is free, a circuit is formed from positive potential over contact 1 of relay L32 (FIG. 11), contact 6 of relay R4 (FIG. 6), the upper winding of relay R20 (FIG. 5), contact 6 of SR1, connector MK3, contact 4 of relay G2 (FIG. 4), resistor $r3$ to negative potential. Relay R20 (FIG. 5) operates and causes the operation of relays RS1 and RS3 (FIG. 10) and relay G1( FIG. 4).

When relay RS1 operates, negative potential is applied to the information circuit over crossbar switch KLII and connector MKLII (FIG. 11). The selecting magnets GS3 and GS5 (FIG. 4) are operated, and the operation of GS5 causes the operation of holding magnet GB6. Relay S2 (FIG. 3) also operates and causes the operation of selecting mangets S$t$–0, L$t$–0, S$e$–1 and L$e$–1. The operation of S$e$–1 causes the operation of selecting magnet GS2 and relay G2 (FIG. 4). The selecting magnets required for the desired connection have now been operated in the final selector and the group selector.

Relay R21 (FIG. 5) is now energized in the following circuit: negative potential, winding of R21, contact 4 of SR1, connector MK4, contact 3 of GS2 (FIG. 4), contact 1 of GS5, contact 2 of L$t$–0 (FIG. 3), positive potential. Relay R21 when operated interrupts the energizing circuits for relays RS1 and RS3 (FIG. 10) and relay G1 (FIG. 4). The release of relay RS1 causes the release of relay S2 (FIG. 3). Relay R21 also closes an energizing circuit for holding magnet GB2 (FIG. 4) from positive potential, winding of GB2, wire $e2$, contact 5 of RB (FIG. 5), contact 1 of R21, negative potential. Relay BR101 (FIG. 2) is operated over the wire $c$. Relay R16 (FIG. 5) operates and causes the operation of relay R18. Relay LL1 in the link circuit (FIG. 7) is now operated. Relay R16 is released again and relay R15 is also released after a time delay of 500 milliseconds.

When relay LL1 (FIG. 7) operates a signalling circuit from minus RG is closed through the upper winding of the ring trip relay LL4 to the called station and is returned from the called station through the lower winding of LL4 to positive potential.

When relay R15 (FIG. 5) is release after some delay, the said signalling circuit is shifted to periodic signalling from minus IRG over contact 4 of relay LL2 (FIG. 7) which now operates.

Relay LL3 (FIG. 7) is now operated in the loop circuit from station A110. Hereby the holding circuit for RB (FIG. 5) is broken at contact 5 of LL3.

The desired connection has been established. The following switching members are in operated condition taken in order from the calling station: BR110 (FIG. 2), B$t$–1 (FIG. 3), B1, GB3 (FIG. 4), GB1, LL2 (FIG. 7), LL3, LL1, GB2 (FIG. 4), GB4, B2 (FIG. 3), B$e$–1, BR101 (FIG. 2).

It is also possible to transfer the information on which station has called by sending to the analyzer a special signal marking the origin which signal can be equal for all stations which have the same traffic conditions. It is not necessary, as in the shown embodiment, to transfer the number of the calling station to a common analyzer, but the transfer can also be effected directly to a reigster or a marker.

It is also possible to let the setting of the switches to the calling line indicate the identity or category of the line. The transfer of information or category can of course also be effected over separate conductors over the switches. The indications of category can also be effected in separate means cooperating with the control equipment.

What we claim is:

1. An automatic telecommunication system comprising a plurality of subscribers' stations, a central exchange, lines connecting the subscribers' stations with the central exchange, selecting means in the exchange for selecting an outgoing line, connecting means for connecting the selected outgoing line to an incoming calling line, and control circuits for controlling said selecting means, said control circuits including first contact means operable upon the initiation of a call from a line to be set in accordance with the identity of the calling line, and second contact means operable by switching signals received from the calling line.

2. An automatic telecommunication system as claimed in claim 1, in which said first contact means are operable by line identifying means upon the initiation of a call in such manner that contacts of said first contact means are operated in a combination indicating the number of the calling line.

3. An automatic telecommunication system, comprising a plurality of subscribers' stations having means for sending switching signals of a first kind and switching signals of a second kind, a central exchange, lines connecting the subscribers' stations with the central exchange, selecting means in the central exchange for selecting an outgoing line, connecting means for connecting the selected outgoing line with an incoming calling line, and control circuits for controlling said selecting means, said control circuits including a first set of circuits having contact means operable by switching signals of said first kind to cause the selection of an outgoing line solely in dependence of the switching signals of said first kind, and a second set of circuits including first contact means operable upon the initiation of a call from a line to be set in accordance with the identity of the calling line and second contact means operable by switching signals of said second kind to cause the selection of an outgoing line in dependence both of the identity of the calling line and of said switching signals of the second kind.

References Cited by the Examiner

UNITED STATES PATENTS

| | | | |
|---|---|---|---|
| 2,951,908 | 9/60 | Malthaner et al. | 179—18 |
| 2,998,493 | 8/61 | Gibson | 179—18 |

ROBERT H. ROSE, *Primary Examiner.*

THOMAS B. HABECKER, WILLIAM C. COOPER,
*Examiners.*